United States Patent Office 3,541,408
Patented Nov. 17, 1970

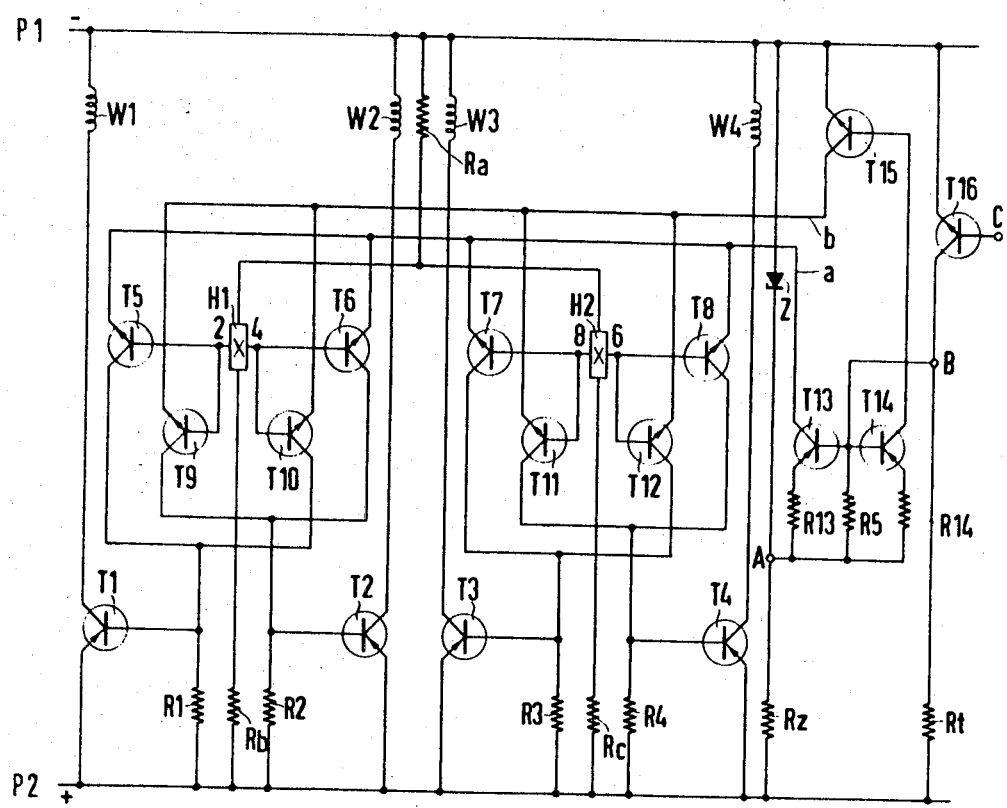

3,541,408
SPEED CONTROL CIRCUIT FOR BRUSHLESS DC MOTOR
Manfred Schwendtner, Schwarzenbruck, and Jürgen Wenk, Erlangen, Germany, assignors to Siemens Aktiengesellschaft, Munich, Germany, a corporation of Germany
Filed Dec. 3, 1968, Ser. No. 780,843
Claims priority, application Germany, Dec. 6, 1967, 1,613,438
Int. Cl. H02k 29/00
U.S. Cl. 318—138                                9 Claims

ABSTRACT OF THE DISCLOSURE

The speed of a brushless DC motor is controlled via a speed control circuit and a plurality of transistors and power transistors connected between the speed control circuit and the stator windings of the motor.

DESCRIPTION OF THE INVENTION

The present invention relates to a speed control circuit. More particularly, the invention relates to a speed control circuit for a brushless DC motor.

There are several known arrangements for controlling the speed of a brushless or commutatorless DC motor. In such arrangements, the brushless DC motor is only controlled in one aspect with respect to speed. That is, although the motor is accelerated when the speed decreases below a desired level, the motor is only decelerated when the speed is too high. This results in a limited and load-dependent speed control.

The principal object of the present invention is to provide a new and improved speed control circuit for a brushless DC motor.

An object of the present invention is to provide a speed control circuit for a brushless DC motor which overcomes the disadvantages of known similar circuits.

An object of the present invention is to provide a speed control circuit for a brushless DC motor which provides a wide and accurate speed control.

An object of the present invention is to provide a speed control circuit for a brushless DC motor which operates with efficiency, effectiveness, accuracy and reliability.

An object of the present invention is to provide a speed control circuit for a brushless DC motor which controls the direction of rotation of the motor in either direction.

The speed control circuit of the present invention permits the reversal of the direction of rotation of the motor during operation, so that the motor may be subjected to additional braking action, via a braking current, if the speed increases to too high a level. The speed control circuit of the present invention also permits a simple reversal of the motor so that such motor may be used as a lagging motor.

In accordance with the present invention, a speed control circuit for a brushless DC motor having a diametrically magnetized permanent magnet rotor and two stator windings mutually displaced by 90 electrical degrees, each of the stator windings comprising a pair of windings, comprises a source of DC voltage having a positive polarity terminal and a negative polarity terminal. Each of a plurality of power transistors has emitter, collector and base electrodes and an emitter-collector path connected in series with a corresponding one of each of the pair of windings of each of the stator windings between the positive and negative polarity terminals of the voltage source. Each of a plurality of transistors of opposite type than the power transistors has emitter, collector and base electrodes and each of the power transistors is connected to and controlled by a corresponding pair of the transistors. A first Hall generator has a pair of Hall voltage electrodes each connected to the base electrode of a corresponding one of a first pair of the transistors and a pair of control current electrodes each connected to a corresponding one of the terminals of the voltage source. A second Hall generator has a pair of Hall voltage electrodes each connected to the base electrode of a corresponding one of the second pair of the transistors and a pair of control current electrodes each connected to a corresponding one of the terminals of the voltage source.

Each of a first additional pair of transistors has emitter, collector and base electrodes and is connected between a corresponding one of the first pair of transistors and a corresponding one of the power transistors for supplying a control pulse to a pair of the power transistors. One of the first additional pair of transistors is connected with its base electrode in common to a Hall voltage electrode of the first Hall generator and to the base electrode of one of the first pair of transistors and with its collector electrode to the base electrode of a first of the power transistors. The other of the first additional pair of transistors is connected with its base electrode in common to the other Hall voltage electrode of the first Hall generator and to the base electrode of the other of the first pair of transistors and with its collector electrode to the base electrode of a second of the transistors. Each of a second additional pair of transistors has emitter, collector and base electrodes and each is connected between a corresponding one of the second pair of transistors and a corresponding one of the power transistors for supplying a control pulse to another pair of the power transistors. One of the second additional pair of transistors is connected with its base electrode in common to a Hall voltage electrode of the second Hall generator and to the base electrode of one of the second pair of transistors and with its collector electrode to the base electrode of a third of the power transistors. The other of the second additional pair of transistors is connected with its base electrode in common to the other Hall voltage electrode of the second Hall generator and to the base electrode of the other of the second pair of transistors and with its collector electrode to the base electrode of a fourth of the power transistors.

A collector connector connects the collector electrode of each transistor and each additional transistor to one of the terminals of the voltage source via a plurality of resistors. An emitter connector connects the emitter electrode of each transistor in common. An additional emitter connector connects the emitter electrode of each additional transistor in common. A switch is connected between the emitter and additional emitter connectors and the other terminal of the voltage source for selectively connecting the transistors and the additional transistors to the other terminal of the voltage source.

A speed control circuit includes the switch and the switch is controlled in accordance with the operation of the speed control circuit. The speed control circuit comprises a plurality of control transistors connected to and controlling the switch. A bridge circuit is connected to the control transistors for connecting the control transistors. The bridge circuit comprises a Zener diode and a first bridge resistor connected in a first branch and a first transistor and a second bridge resistor connected in a second branch.

A pair of control transistors of the speed control circuit comprises complementary transistors each having emitter, collector and base electrodes and a base-emitter path. The bridge circuit of the speed control circuit further comprises a third bridge resistor connected in a zero branch in parallel with the base-emitter paths of the complementary transistors. A first emitter resistor is connected to the emitter electrode of one of the complementary transistors and a second emitter resistor is connected to the emitter electrode of the other of the complementary transistors. The resistance value of the second emitter resistor is greater than the resistance value of the first emitter resistor. Each of the complementary transistors may comprise a field effect transistor. The emitter connector is connected to the collector electrode of one of the complementary transistors. The additional emitter connector is coupled to the collector electrode of the other of the complementary transistors via one of the control transistors of the speed control circuit.

The motor rotates in one or the opposite direction of rotation in accordance with which of the two sets of transistors is connected to the voltage source, so that reversal of the direction of rotation of the motor is accomplished in a simple manner. The application of a control voltage to the emitter electrodes of the two sets of transistors is accomplished via the complementary transistors. The bridge circuit determines which of the two sets of transistors is to be connected to the voltage source. The speed of the motor is controlled by supplying to the bridge circuit a current which is proportional to the deviation of speed from a desired level. When the speed is too low, the motor is accelerated via one of the sets of transistors, and when the speed is too high, the motor is decelerated by the other set of transistors.

In order that the present invention may be readily carried into effect, it will now be described with reference to the accompanying drawing, wherein the single figure is a circuit diagram of an embodiment of the speed control circuit of the present invention for a brushless DC motor.

In the figure, a first stator winding of a brushless DC motor comprises stator windings W1 and W2 and a second stator winding comprises stator windings W3 and W4. The two stator windings of the motor are mutually displaced by 90 electrical degrees. One end of each of the stator windings W1 to W4 is directly connected to the negative polarity terminal P1 of a source of DC voltage.

The other end of the stator winding W1 is connected to the positive polarity terminal P2 of the source of DC voltage via a first power transistor T1. The other end of the stator winding W2 is connected to the terminal P2 of the voltage source via a second power transistor T2. The other end of the stator winding W3 is connected to the terminal P2 of the voltage source via a third power transistor T3. The other end of the stator winding W4 is connected to the terminal P2 of the voltage source via a fourth power transistor T4.

The power transistors T1 to T4 are controlled by a plurality of transistors T5, T6, T7 and T8. The base electrode of the transistor T5 is connected to the Hall voltage electrode 2 of a first Hall generator H1 and the base electrode of the transistor T6 is connected to the Hall voltage electrode 4 of said first Hall generator. The base electrode of the transistor T7 is connected to the Hall voltage electrode 8 of a second Hall generator H2 and the base electrode of the transistor T8 is connected to the Hall voltage electrode 6 of said second Hall generator. The control current electrodes of the first and second Hall generators H1 and H2 are supplied with current from the voltage source via a resistor R*a*, which is connected between the terminal P1 of the voltage source and a corresponding one of the control current electrodes of each of said Hall generators and resistors R*b* and R*c* connected between the other control current electrode of the first Hall generator and the terminal P2 of the voltage source and connected between the other control current electrode of the second Hall generator and said terminal, respectively.

The collector electrode of the transistor T5 is connected to the terminal P2 of the voltage source via a resistor R1 and the collector electrode of the transistor T6 is connected to said terminal via a resistor R2. The collector electrode of the transistor T7 is connected to the terminal P2 of the voltage source via a resistor R3 and the collector electrode of the transistor T8 is connected to said terminal via a resistor R4. The emitter electrode of each of the transistors T5, T6, T7 and T8 is connected in common via an emitter connector *a*. When the emitter connector *a* is connected to the negative polarity terminal P1 of the voltage source, the motor is started and rotates in a specific direction determined by the effect on the Hall generators H1 and H2 of the magnetic field of the rotary permanent magnet rotor of said motor. The first and second Hall generators are in operative proximity with the magnetic field produced by the diametrically magnetized permanent magnet rotor of the motor. The transistors T5, T6, T7 and T8 are controlled in a specific cycle, so that they control the power transistors T1, T2, T3 and T4 in a similar manner to connect the stator windings W1, W2, W3 and W4 to the source of DC voltage. The circuit described thus far is known and functions in a known manner.

The direction of rotation of the motor may be reversed, in accordance with the present invention, by a plurality of additional transistors T9, T10, T11 and T12. The base electrode of the additional transistor T9 is connected in common to the Hall voltage electrode 2 of the first Hall generator H1 and the base electrode of the transistor T5. The base electrode of the additional transistor T10 is connected in common to the Hall voltage electrode 4 of the first Hall generator H1 and to the base electrode of the transistor T6. The collector electrode of the additional transistor T9 and the collector electrode of the transistor T6 are connected in common to the base electrode of the second power transistor T2. The collector electrode of the additional transistor T10 and the collector electrode of the transistor T5 are connected in common to the base electrode of the first power transistor T1. The base electrode of the additional transistor T11 is connected in common to the Hall voltage electrode 8 of the second Hall generator H2 and to the base electrode of the transistor T7. The base electrode of the additional transistor T12 is connected in common to the Hall voltage electrode 6 of the second Hall generator H2 and to the base electrode of the transistor T8. The collector electrode of the additional transistor T11 and the collector electrode of the transistor T8 are connected in common to the base electrode of the fourth power transistor T4. The collector electrode of the additional transistor T12 and the collector electrode of the transistor T7 are connected in common to the base electrode of the third power transistor T3.

The power transistors T1 to T4 are of opposite type from the transistors T5 to T8 and the additional transistors T9 to T12. Thus, for example, the power transistors T1 to T4 are of PNP type whereas the transistors T5 to T8 and the additional transistors T9 to T12 are of NPN type. The emitter electrode of each of the additional transistors T9, T10, T11 and T12 is connected to a common additional emitter connector *b*. When the additional emitter connector *b* is connected to the negative polarity terminal P1 of the voltage source, a control pulse displaced by 180° is supplied to the power transistors T1, T2, T3 and T4. The control pulse supplied to the power transistors T1 to T4 causes the reversal of the rotary direction of the rotor of the motor. Alternating connection of the emitter connector *a* and the additional emitter connecor *b* to the voltage source provides a simple reversing operation.

A speed control circuit comprises a bridge circuit which includes a Zener diode Z and a resistor Rz connected in a first branch and a transistor T16 and a resistor R*t* connected in a second branch. The bridge circuit has a zero branch AB which comprises a resistor R5. The resistor R5 of the zero branch of the bridge circuit is connected in parallel with the base-emitter paths of a pair of complementary transistors T13 and T14. A first emitter resistor R13 is connected to the emitter electrode of the first complementary transistor T13 and a second emitter resistor R14 is connected to the emitter electrode of the second complementary transistor T14. The first and second emitter resistors are utilized in order to avoid hysteresis and the resistance value of the second emitter resistor R14 is greater than the resistance value of the first emitter resistor R13.

The complementary transistors T13 and T14 may be replaced by field effect transistors. If field effect transistors are utilized, the first and second emitter resistors R13 and R14 become superfluous. One of the complementary transistors T13 and T14 is in its conductive condition in accordance with the flow of current through resistor R5. The current supplied via the conductive one of the complementary transistors is supplied either to the transistors T5 to T8 via the emitter connector *a* or to the additional transistors T9 to T12 via the additional emitter connector *b*. Since the direction of current flow is the same in the emitter connector *a* and the additional emitter connector *b*, a transistor T15 is connected between the second complementary transistor T14 and said additional emitter connector to invert the current direction of said second complementary transistor.

In operation, a current proportional to the deviation of the speed of the motor from a desired level is supplied to the base electrode of the transistor T16 via an input terminal C. Such current is provided in any suitable manner by any suitable means. The supply of a current to the base electrode of the transistor T16 varies the resistance value of said transistor accordingly. When the speed is at the desired level, no current is supplied to the base electrode by the transistor T16, so that there is no potential difference between the null points A and B of the bridge circuit. When the null points A and B of the bridge circuit are at the same potential, no current flows through the resistor R5, so that neither of the complementary transistors T13 and T14 is switched to its conductive condition. Consequently, both complementary transistors T13 and T14 are in their nonconductive condition and no current is supplied to the stator windings W1 to W4 of the motor.

When the motor rotates in a specific direction, the null point B has a positive potential relative to the null point A of the bridge circuit. The first complementary transistor T13 is thus switched to its conductive condition and therefore causes the switching of the transistors T5 to T8 to their conductive condition in a specific cycle. When the rotary speed of the motor exceeds the desired level, the polarity of the potential at the null points A and B of the bridge circuit is reversed. The second complementary transistor T14 is thus switched to its conductive condition and the first complementary transistor T13, as well as the transistors T5 to T8, are switched to their nonconductive condition. The conductive second complementary transistor T14 causes the switching of the transistor T15 to its conductive condition and the switching of the additional transistors T9 to T12 to their conductive condition in a specific cycle. When the additional transistors T9 to T12 are in their conductive condition, the rotor of the motor is decelerated, so that its rotary speed is decreased to the desired level.

If the rotary speed of the motor is lower than the desired level, an error signal will be supplied to the base electrode of the transistor T16 via the input terminal C so that the relative potential of the null points A and B of the bridge circuit will respond accordingly. The motor will then rotate in accordance with the polarity of the error signal in either direction of rotation.

While the invention has been described by means of a specific example and in a specific embodiment, we do not wish to be limited thereto, for obvious modifications will occur to those skilled in the art without departing from the spirit and scope of the invention.

We claim:

1. A speed control circuit for a brushless DC motor having a diametrically magnetized permanent magnet rotor and two stator windings mutually displaced by 90 electrical degrees, each of said stator windings comprising a pair of windings, said circuit comprising a source of DC voltage having a positive polarity terminal and a negative polarity terminal;

a plurality of power transistors each having emitter, collector and base electrodes and an emitter-collector path connected in series with a corresponding one of each of the pair of windings of each of said stator windings between the positive and negative polarity terminals of said voltage source;

a plurality of transistors of opposite type than said power transistors each having emitter, collector and base electrodes, each of said power transistors being connected to and controlled by a corresponding pair of said transistors;

a first Hall generator having a pair of Hall voltage electrodes each connected to the base electrode of a corresponding one of a first pair of said transistors and a pair of control current electrodes each connected to a corresponding one of the terminals of said voltage source;

a second Hall generator having a pair of Hall voltage electrodes each connected to the base electrode of a corresponding one of a second pair of said transistors and a pair of control current electrodes each connected to a corresponding one of the terminals of said voltage source;

a first additional pair of said transistors each having emitter, collector and base electrodes, each connected between a corresponding one of said first pair of transistors and a corresponding one of said power transistors for supplying a control pulse to a pair of said power transistors, one of said first additional pair of transistors being connected with its base electrode in common to a Hall voltage electrode of said first Hall generator and to the base electrode of one of said first pair of transistors and with its collector electrode to the base electrode of a first of said power transistors and the other of said first additional pair of transistors being connected with its base electrode in common to the other Hall voltage electrode of said first Hall generator and to the base electrode of the other of said first pair of transistors and with its collector electrode to the base electrode of a second pair of said transistors;

a second additional pair of said transistors each having emitter, collector and base electrodes, each connected between a corresponding one of said second pair of transistors and a corresponding one of said power transistors for supplying a control pulse to another pair of said power transistors, one of said second additional pair of transistors being connected with its base electrode in common to a Hall voltage electrode of said second Hall generator and to the base electrode of one of said second pair of transistors and with its collector electrode to the base electrode of a third of said power transistors and the other of said second additional pair of transistors being connected with its base electrode in common to the other Hall voltage electrode of said second Hall generator and to the base electrode of the other of said second pair of transistors and with its collector electrode to the base electrode of a fourth of said power transistors;

a plurality of resistors;

collector connecting means connecting the collector electrode of each transistor and each additional transistor to one of the terminals of said voltage source via said resistors;

emitter connecting means connecting the emitter electrode of each transistor in common;

additional emitter connecting means connecting the emitter electrode of each additional transistor in common; and switching means connected between said emitter and additional emitter connecting means and the other terminal of said voltage source for selectively connecting the transistors and additional transistors to said other terminal of said voltage source.

2. A speed control circuit as claimed in claim 1, further comprising speed control means including said switching means, said switching means being controlled in accordance with the operation of said speed control means.

3. A speed control circuit as claimed in claim 2, wherein said speed control means comprises a plurality of control transistors connected to and controlling said switching means and a bridge circuit connected to said control transistors for controlling said control transistors.

4. A speed control circuit as claimed in claim 3, wherein the bridge circuit of said speed control means comprises a Zener diode and a first bridge resistor connected in a first branch and a first transistor and a second bridge resistor connected in a second branch.

5. A speed control circuit as claimed in claim 4, wherein a pair of the control transistors of said speed control means comprise complementary transistors each having emitter, collector and base electrodes and a base-emitter path, and the bridge circuit of said speed control means further comprises a third bridge resistor connected in a zero branch in parallel with the base-emitter paths of said complementary transistors.

6. A speed control circuit as claimed in claim 5, wherein said speed control means further comprises a first emitter resistor connected to the emitter electrode of one of said complementary transistors and a second emitter resistor connected to the emitter electrode of the other of said complementary transistors.

7. A speed control circuit as claimed in claim 5, wherein each of said complementary transistors of said speed control means comprises a field effect transistor.

8. A speed control circuit as claimed in claim 5, wherein said emitter connecting means is connected to the collector electrode of one of said complementary transistors and said additional emitter connecting means is coupled to the collector electrode of the other of said complementary transistors via one of the control transistors of said speed control means.

9. A speed control circuit as claimed in claim 6, wherein the resistance value of said second emitter resistor is greater than the resistance value of said first emitter resistor.

References Cited

UNITED STATES PATENTS 3,444,447   5/1969   Newell _____ 318—138

GLEN SIMMONS, Primary Examiner

U.S. Cl. X.R.

318—254